United States Patent [19]

Sozzi et al.

[11] Patent Number: 4,732,769

[45] Date of Patent: Mar. 22, 1988

[54] SOFT, UNRIPENED CHEESE

[75] Inventors: Tomaso Sozzi, Lausanne; Robert Pousaz, L'Abergement s/Orbe; Hugh Hose, Yverdon, all of Switzerland

[73] Assignee: Nestec S.A., Vevey, Switzerland

[21] Appl. No.: 833,107

[22] Filed: Feb. 25, 1986

[30] Foreign Application Priority Data

Mar. 12, 1985 [CH]  Switzerland .......................... 1102/85

[51] Int. Cl.⁴ ............................................ A23C 19/032
[52] U.S. Cl. ......................................... 426/40; 426/61; 426/582; 426/585; 426/36
[58] Field of Search ...................... 426/36, 34, 39, 40, 426/582, 61, 585

[56] References Cited

U.S. PATENT DOCUMENTS 4,194,011  3/1980  Invernizzi et al. ..................... 426/36
4,397,878  8/1983  Koide et al. .......................... 426/582
4,534,982  8/1985  Yoshida et al. ....................... 426/40

Primary Examiner—Raymond N. Jones
Assistant Examiner—Marianne M. Cintins
Attorney, Agent, or Firm—Vogt & O'Donnell

[57]  ABSTRACT

A soft, unripened cheese having a dry matter content of from 18 to 35%, of which at least 40% consists of the non-fat solids of milk. The cheese is prepared from concentrated milk by innoculating the milk with a culture of a combination of strains of thickening *Streptococcus cremoris*, strongly acidifying *Streptococcus cremoris* and mildly acidifying *Streptococcus lactis*.

9 Claims, No Drawings

SOFT, UNRIPENED CHEESE

This invention relates to a soft, unripened cheese and to a process for its production.

The traditional method for making soft cheeses comprises the steps of inoculating a pasteurized milk with a culture of lactic bacteria growing at relatively low temperature, optionally adding rennet, prolonged incubation to obtain an essentially lactic curd and prolonged drainage or centrifuging of the curd. Depending on how the drained curd is further processed and on the quantities of cream added, cheeses of various fat contents are obtained, including, for example, petit-suisse, of which the curd has to be homogenized and smoothed to acquire the appropriate unctuous and spreadable texture. Separation of the lactoserum during centrifuging or drainage involves elimination of most of the soluble constituents of the milk, particularly lactose, vitamins and proteins of high quality.

In order not to lose these various components, some attempts have been made to produce a product similar to cheese, particularly soft cheese, without draining the curd. Thus, one known process comprises the steps of reducing the calcium and magnesium contents of the milk, adding cream, homogenization, concentration to a dry matter content of 44%, pasteurization, inoculation of the concentrated milk with a culture of lactic bacteria and incubation in the final pack. Although ingenious, this process comprises a complicated and onerous fundamental step, namely decationization, and the massive addition of fats in a quantity of approximately 70% by weight, based on dry matter, to obtain the desired texture.

In another known process, the milk is concentrated to the dry matter content of a cheese which it is desired to imitate, the culture of lactic bacteria used in the traditional manufacture of this cheese is added as ripening agent and the whole is coagulated with rennet with the additional aid of a little calcium chloride. The formation of a curd such as this with rennet is so difficult that it necessitates the addition of a chemical coagulating agent, such as a calcium salt. In addition, the high lactose content of the curd represents an unusually rich medium for the ripening culture which may rapidly give rise to overacidification of the curd.

Finally, in a known process for making a spreadable product similar to a cream cheese, the whole object is to eliminate as much lactose as possible in order to avoid the problems of overacidification and fermentation by yeasts which may be encountered where a concentrated milk rich in lactose is used.

This known process comprises acidifying with lactic bacteria a mixture of cream and a casein solution having a high salt content, particularly in the form of emulsifying salts.

The object of the present invention is to provide a soft, unripened cheese based on essentially lactic curd which contains all the soluble constituents of the milk but only very little, if any, added salt, which is stable and which therefore is not exposed to the risks of overacidification, which has an acceptable taste and aroma despite its high lactose content and which has an unctuous and spreadable texture irrespective of its fat content.

To this end, the soft, unripened cheese according to the invention is characterized in that it has a dry matter content of from 18 to 35% by weight, at least 40% and preferably at least 50% by weight of its dry matter content consisting of the non-fat solids of the milk and in that it has a pH of from 4.3 to 4.8, this pH having been obtained by acidification with a combination of strains of thickening *Streptococcus cremoris*, strongly acidifying *Streptococcus cremoris* and mildly acidifying *Streptococcus lactis*.

Similarly, the process for producing a soft cheese according to the invention is characterized in that a pasteurized concentrated milk having a dry matter content of from 18 to 35% by weight, at least 40% by weight of its dry matter content consisting of the non-fat solids of the milk, is prepared and inoculated with a culture comprising a combination of strains of thickening *Streptococcus cremoris*, strongly acidifying *Streptococcus cremoris* and mildly acidifying *Streptococcus lactis*, followed by incubation for 8 to 30 h at 22° to 35° C. to pH 4.3–4.8.

It has been found that it is possible to make a soft cheese having the desired qualities by acidification of a concentrated milk, optionally containing added milk fats, with a suitable combination of lactic bacteria. After numerous tests with various strains and combinations of strains, it has been found that it is necessary to combine strains of thickening *Streptococcus cremoris*, strongly acidifying *Streptococcus cremoris* and mildly acidifying *Streptococcus lactis*. It has been found in particular that it is possible with advantage to combine the strains *Streptococcus cremoris* CNCM I-369, thickening, *Streptococcus cremoris* CNCM I-370, strongly acidifying, and *Streptococcus lactis* CNCM I-371, mildly acidifying.

These last three strains were lodged under the Budapest Treaty on the 21st November, 1984 in the Collection Nationale de Cultures de Microorganismes (CNCM) of the Institut Pasteur, 25 rue du Docteur Roux, 75724 Paris Cedex 15, France, where they were subsequently given the respective Nos. I-369, I-370 and I-371.

The three strains forming on the combination according to the invention probably each have a separate and essential function to perform in the process by which the lactic curd is formed. Thus, if mildly acidifying *Streptococcus lactis* were not used in the combination, the soft cheese does not have an acceptable taste or aroma; instead, the insipid taste of lactose predominates. If thickening *Streptococcus cremoris* is not used in the combination, the curd does not have an unctuous and stable texture; instead, it is too friable and exudes lactoserum. If strongly acidifying *Streptococcus cremoris* is not used, the acidification is insufficient, and the curd forms with difficulty and does not keep.

To carry out the process according to the invention, therefore, a milk concentrated to a dry matter content of from 18 to 35% by weight, at least 40% by weight and preferably at least 50% by weight of its dry matter content consisting of the non-fat solids of the milk, is prepared either by concentrating an optionally skimmed cow's milk, for example, by evaporation in vacuo, or by mixing water and/or cow's milk with a skimmed or whole powdered cow's milk and, if necessary, adding cream, particularly cream itself concentrated by evaporation in vacuo, or butter oil. Other animal or vegetable fats may also be used.

The concentrated milk may then be homogenized, optionally, after preheating to 45°–70° C., for example, under a pressure of approximately 200 to 400 bar, for example. The concentrated milk is then pasteurized to eliminate the microorganisms capable of interfering with the subsequent acidification process or of subsequently developing and prematurely degrading the cream cheese. This pasteurization may be carried out at preferred temperatures of approximately 75° to 95° C., for example, for a few tens of seconds to a few minutes or even for a few tens of minutes. Higher temperatures and shorter times may also be used.

The pasteurized concentrated milk may be inoculated with a sufficient amount approximately 1 to 5% by volume, of a culture comprising per cm$^3$ said combination of strains in a quantity of approximately $10^7$ to $10^{10}$ and preferably $10^8$ to $10^9$ germs of each of said strains of Streptococcus.

Said culture may comprise in particular a combination of the strains *Streptococcus cremoris* CNCM I-369, thickening, *Streptococcus cremoris* CNCM I-370, strongly acidifying, and *Streptococcus lactis* CNCM I-371, mildly acidifying.

If it is desired to increase the firmness of the curd of the soft cheese to be obtained, a little rennet may be added to the pasteurized concentrated milk at the same time as the culture comprising said combination of strains. However, the rennet should preferably not play a dominant role in the formation of the curd which should preferably remain essentially lactic. Incubation is carried out at a temperature of from 22° to 35° C., which is favorable to and sufficient for the growth of the present mesophilic strains, over the period of approximately 8 to 30 h which is necessary and sufficient for for these strains to acidify the concentrated milk to a limiting pH of approximately 4.3 to 4.8, beyond which they lose virtually all their activity at ambient temperature or under refrigeration.

Incubation may be carried out in tanks or directly in the final pack, for example, in sterilized pots impervious to microorganisms. Incubation in tanks enables the cheese to be subsequently mixed with various common aromatic additives, such as herbs, pepper or garlic, for example.

The soft cheese obtained has an unctuous and spreadable curd and a natural taste and aroma similar to those of petit-suisse, although it contains all the non-fat solid components of the milk in a proportion of at least 40 to and preferably at least 50% by weight of its dry matter.

The packed cheese is preferably stored in a refrigerator where it will keep for approximately 6 months at 5° C. It will also keep for around 2 months at 15° to 20° C.

The invention is illustrated by the following Examples in which the percentages represent percentages by weight, unless otherwise indicated, and the term "milk" denotes a cow's milk.

EXAMPLE 1

100 liters of whole milk are concentrated by evaporation in vacuo to a dry matter content of 28%. The concentrated milk is heated to 70° C., homogenized under a pressure of 300 bar, pasteurized at 80° C. for 40 s and then cooled to 35° C. The milk is then inoculated in a tank with 3% by volume of a culture of mesophilic strains containing per cm$^3$ approximately $10^8$ germs of a strain of thickening *Streptococcus cremoris*, approximately $10^8$ germs of a strain of strongly acidifying *Streptococcus cremoris* and approximately $10^8$ germs of a strain of mildly acidifying *Streptococcus lactis*.

0.2% of NaCl is then added and the whole is incubated for 20 h at 35° C. A soft, unripened cheese is obtained which has a pH of 4.4, an unctuous and spreadable texture and a fresh, milky aroma similarly to that of petit-suisse. Its composition is as follows:

| dry matter | 28% | |
|---|---|---|
| proteins | 25.5% | by weight, based on dry matter |
| fat | 29% | by weight, based on dry matter |
| lactose | 39.3% | by weight, based on dry matter |
| ash | 6.2% | by weight, based on dry matter |

After filling in sterilized 0.25 liter pots, this soft cheese retains all its qualities and, in particular, does not show any signs of syneresis after storage for 2 months at 15° C.

EXAMPLE 2

The procedure is as described in Example 1, except that rennet is also added to the concentrated milk in a quantity of 1 ml of 1/10,000 rennet per 100 l of concentrated milk. A soft, unripened cheese is obtained of which the curd is firmer than that of the cheese described in Example 1.

EXAMPLE 3

100 liters of whole milk, 47 kg of powdered skimmed milk, 115 liters of cream containing 35% fats and 160 kg of water are mixed and preheated to 45° C. This concentrated milk is then homogenized under a pressure of 300 bar, pasteurized at 80° C. for 30 s and cooled to 35° C. It is then inoculated with 3% by volume of a culture containing per cm$^3$ approximately $10^9$ germs of thickening *Streptococus cremoris* CNCM I-369, approximately $10^8$ germs of strongly acidifying *Streptococcus cremoris* CNCM I-370 and approximately $10^8$ germs of mildly acidifying *Streptococcus lactis* CNCM I-371. The milk thus treated is then filled in sterilized 0.25 l pots and incubated at 30° C. for 25 h.

A cream cheese is obtained which has a pH of 4.4, an unctuous and spreadable texture and an aroma similar to that of petit-suisse. Its composition is as follows:

| dry matter | 24% | |
|---|---|---|
| proteins | 22% | by weight, based on dry matter |
| fats | 44% | by weight, based on dry matter |
| lactose | 28% | by weight, based on dry matter |
| ash | 6% | by weight, based on dry matter |

After storage in a refrigerator for 6 months at 5° C., its taste is not tainted by any bitterness or exaggerated acidity and its body has only exuded a negligible quantity of lactoserum.

EXAMPLE 4

300 liters of cream containing 15% fats and 45 kg of powdered skimmed milk are mixed, preheated to 45° C., homogenized under a pressure of 300 bar, pasteurized for 30 s at 80° C. and cooled to 35° C. This concentrated milk is inoculated with 1% by volume of a culture containing per cm$^3$ approximately $10^8$ germs of thickening *Streptococcus cremoris* CNCM I-369, approximately $10^8$ germs of strongly acidifying *Streptococcus cremoris* CNCM I-370 and approximately $10^9$ germs of mildly acidifying *Streptococcus lactis* CNCM I 371. It is then filled in sterilized pots and incubated for 20 h at 30° C.

A cream cheese is obtained which has a pH of 4.7, a creamy, unctuous and spreadable texture and a fresh and milky aroma of fresh cream cheese. Its composition is as follows:

| | |
|---|---|
| dry matter | 30% |
| proteins | 18.5% by weight, based on dry matter |
| fats | 50% by weight, based on dry matter |
| lactose | 26% by weight, based on dry matter |
| ash | 5.5% by weight, based on dry matter |

After storage for 1 month at 15° C., it has lost nothing of its freshness and its curd still shows no signs of syneresis.

EXAMPLE 5

16 kg of powdered skimmed milk, 7.5 kg of butter oil and 76 kg of water are mixed, preheated to 55°–60° C., homogenized under a pressure of 300 bar and pasteurized for 30 s at 85°–90° C. This concentrated milk is inoculated with 5% by volume of a culture comprising a combination of strains of thickening *Streptococcus cremoris*, strongly acidifying *Streptococcus cremoris* and mildly acidifying *Streptococcus lactis* in a quantity of approximately $10^8$ germs of each strain per cm$^3$. It is then filled in sterilized pots and incubated for 30 h at 25° C.

A soft, unripened cheese is obtained which has a pH of 4.4, an unctuous and spreadable texture and a taste and aroma similar to those of petit-suisse. Its composition is as follows:

| | |
|---|---|
| dry matter | 23% |
| proteins | 21.6% by weight, based on dry matter |
| fats | 37.4% by weight, based on dry matter |
| lactose | 34.6% by weight, based on dry matter |
| ash | 6.4% by weight, based on dry matter |

After storage in a refrigerator for 6 months at 5° C., its organoleptic qualities and texture are virtually unchanged.

We claim:

1. A lactic curd cheese comprising milk acidified by *Streptococcus cremoris* CNCM I-369, *Streptococcus cremoris* CNCM I-370, and *Streptococcus lactis* CNCM I-371 in an amount sufficient for the cheese to have a pH of approximately 4.3 to 4.8 and having a dry matter content of from 18% to 35% by weight, wherein at least 40% by weight of the dry matter content is non-fat solids.

2. A cheese according to claim 1 wherein the milk is selected from the group consisting of cow's milk and skimmed cow's milk and combinations thereof.

3. A cheese according to claim 1 further comprising fats selected from the group consisting of animal fats and vegetable fats.

4. A cheese according to claim 1 wherein at least 50% by weight of the dry matter content is non-fat solids.

5. A process for producing a cheese comprising first inoculating and then incubating a concentrated, pasteurized milk having a dry matter content of from 18% to 35% by weight of which at least 40% by weight of the dry matter content is non-fat solids, with *Streptococcus cremoris* CNCM I-369, *Streptococcus cremoris* CNCM I-370 and *Streptococcus lactis* CNCM I-371 bacteria, with an incubation time and temperature and an amount of bacteria being sufficient to obtain a cheese having a pH of approximately 4.3 to 4.8.

6. A process according to claim 5 wherein the innoculated milk is incubated for a period of approximately 8 hours to 30 hours at from 22° C. to 35° C.

7. A process according to claim 5 wherein the milk is inoculated with from 1% to 5% by volume of cultures of the CNCM I-369, CNCM I-370 and CNCM I-371 with each culture being in a quantity of approximately $10^7$ to $10^{10}$ germs per cm$^3$.

8. A process according to claim 5 wherein the milk is selected from the group consisting of cow's milk and skimmed cow's milk and combinations thereof.

9. A process according to claim 5 wherein at least 50% by weight of the dry matter content is non-fat solids.

* * * * *